United States Patent
Alfaraj et al.

(10) Patent No.: US 12,534,979 B2
(45) Date of Patent: Jan. 27, 2026

(54) CARBON DIOXIDE MINERALIZATION AND STORAGE

(71) Applicant: SAUDI ARABIAN OIL COMPANY, Dhahran (SA)

(72) Inventors: Rima Taqi Alfaraj, Dhahran (SA); Murtadha J. Altammar, Dhahran (SA); Abeer Ateeq Alarawi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 2 days.

(21) Appl. No.: 18/619,731

(22) Filed: Mar. 28, 2024

(65) Prior Publication Data

US 2025/0305392 A1  Oct. 2, 2025

(51) Int. Cl.
*E21B 41/00* (2006.01)
*C09K 8/594* (2006.01)

(52) U.S. Cl.
CPC .......... *E21B 41/0064* (2013.01); *C09K 8/594* (2013.01)

(58) Field of Classification Search
CPC ....... E21B 41/0064; B65G 5/00; B65G 5/005; C09K 8/594
USPC ........................................................ 166/50
See application file for complete search history.

(56) References Cited

U.S. PATENT DOCUMENTS

| | | | |
|---|---|---|---|
| 2,875,833 A | | 3/1959 | Martin |
| 4,007,788 A | * | 2/1977 | Striegler ............... E21B 43/305 |
| | | | 166/302 |
| 4,445,574 A | * | 5/1984 | Vann ....................... E21B 43/10 |
| | | | 166/50 |

(Continued)

FOREIGN PATENT DOCUMENTS

| | | | | |
|---|---|---|---|---|
| CN | 114541964 A | * | 5/2022 | |
| DE | 102004004689 A1 | * | 9/2005 | ............. B09B 1/008 |

(Continued)

OTHER PUBLICATIONS

Translation of CN-114541964-A (Year: 2022).*

(Continued)

*Primary Examiner* — Angela M DiTrani Leff
(74) *Attorney, Agent, or Firm* — Vorys, Sater, Seymour and Pease, LLP

(57) ABSTRACT

Carbon dioxide may be stored in a subterranean formation. Methods of subterranean carbon dioxide storage may include: introducing, through an injection region of a unified wellbore to a subterranean formation, a carbonated aqueous fluid including carbon dioxide dispersed within an aqueous fluid, wherein the subterranean formation includes a basaltic formation; reacting the carbon dioxide or an ion thereof with the basaltic formation to form mineralized carbon and a produced aqueous fluid; flowing a mixture of the carbonated aqueous fluid and the produced aqueous fluid through a delivery region of the unified wellbore; depositing the mineralized carbon dioxide within the subterranean formation; and flowing the produced aqueous fluid from the (Continued)

subterranean formation through a production region of the unified wellbore, wherein the injection region and the production region are substantially vertical, and wherein the delivery region is substantially horizontal.

19 Claims, 1 Drawing Sheet

(56) References Cited

U.S. PATENT DOCUMENTS

| | | | | |
|---|---|---|---|---|
| 5,450,902 | A * | 9/1995 | Matthews | E21B 43/122 166/372 |
| 6,729,394 | B1 * | 5/2004 | Hassan | E21B 43/305 166/268 |
| 7,360,595 | B2 * | 4/2008 | Zupanick | E21B 41/0064 166/279 |
| 11,401,785 | B2 | 8/2022 | Sun et al. | |
| 11,828,138 | B2 | 11/2023 | Al-Qasim | |
| 2020/0316515 | A1 | 10/2020 | Arkadakskiy et al. | |
| 2023/0038447 | A1 * | 2/2023 | Hasan | C01F 5/24 |
| 2023/0220752 | A1 | 7/2023 | Al-Qasim et al. | |
| 2023/0235214 | A1 | 7/2023 | Hasan et al. | |

FOREIGN PATENT DOCUMENTS

| | | | |
|---|---|---|---|
| KR | 102330696 | B1 | 11/2021 |
| WO | WO-2022187290 | A1 * | 9/2022 |
| WO | WO-2023073426 | A1 * | 5/2023 |

OTHER PUBLICATIONS

Translation of DE-102004004689-A1 (Year: 2005).*

Muhammad Ali, et al., Enhancing the CO2 trapping capacity of Saudi Arabian basalt via nanofluid treatment: Implications for CO2 geo-storage, Chemosphere, vol. 335, 2023.

Muhammad Ali, et al., Saudi Arabian basalt/CO2/brine wettability: Implications for CO2 geo-storage, Journal of Energy Storage, vol. 62, 2023.

Eric H. Oelkers, et al., The subsurface carbonation potential of basaltic rocks from the Jizan region of Southwest Saudi Arabia, International Journal of Greenhouse Gas Control, vol. 120, 2022.

Zhang, Y., et al., Application of U-Shaped Wells Technologies for Efficient Stimulation of CBM, Paper presented at the International Petroleum Technology Conference, Beijing, China, Mar. 2013.

Al-Arnous, Ahmed, et al., Optimization of water consumption of hydraulic fracturing treatment by utilizing recycled flowback fluidse, Paper presented at the SPE Kingdom of Saudi Arabia Annual Technical Symposium and Exhibition, Dammam, Saudi Arabia, Apr. 2018.

Thomas L. Otheim et al., CO2 Sequestration In Basalt: Carbonate Mineralization And Fluid Substitution, Paper presented at the 2011 SEG Annual Meeting, San Antonio, Texas, Sep. 2011.Paper No. SEG-2011-2108 Published: Sep. 18, 2011.

Carbon Storage FAQ's, National Energy Technology Laboratory, retrieved from https://netl.doe.gov/carbon-management/carbon-storage/faqs/carbon-storage-faqs.

TGS, Basalts—The New Path for Permanent CO2 Storage, retrieved from https://www.tgs.com/articles/basalts-the-new-path-for-permanent-co2-storage.

Dong, Yuning. (2020). Analysis on anti-corrosion and anti-scaling technology of water injection well in oil production plant. IOP Conference Series: Earth and Environmental Science. 514.

Jay Renew, P.E., Treatment of Produced Water from Carbon Sequestration Sites for Water Reuse, Mineral Recovery and Carbon Utilization, Southern Research, 2017 Crosscutting Research Portfolio Review Mar. 23, 2017.

Li L, et al., Methodology for the nonlinear coupled multi-physics simulation of mineral dissolution. Int J Numer Anal Methods. 2021; 45: 2193-2213.

Yu Liang, et al., Chapter Fourteen—Special Focus on Produced Water in Oil and Gas Fields: Origin, Management, and Reinjection Practice, Editor(s): Bin Yuan, David A. Wood, Formation Damage During Improved Oil Recovery, Gulf Professional Publishing, 2018, pp. 515-586.

PCT International Search Report & Written Opinion pertaining to International Application No. PCT/US2025/021101; Date of Mailing: Jun. 26, 2025.

* cited by examiner

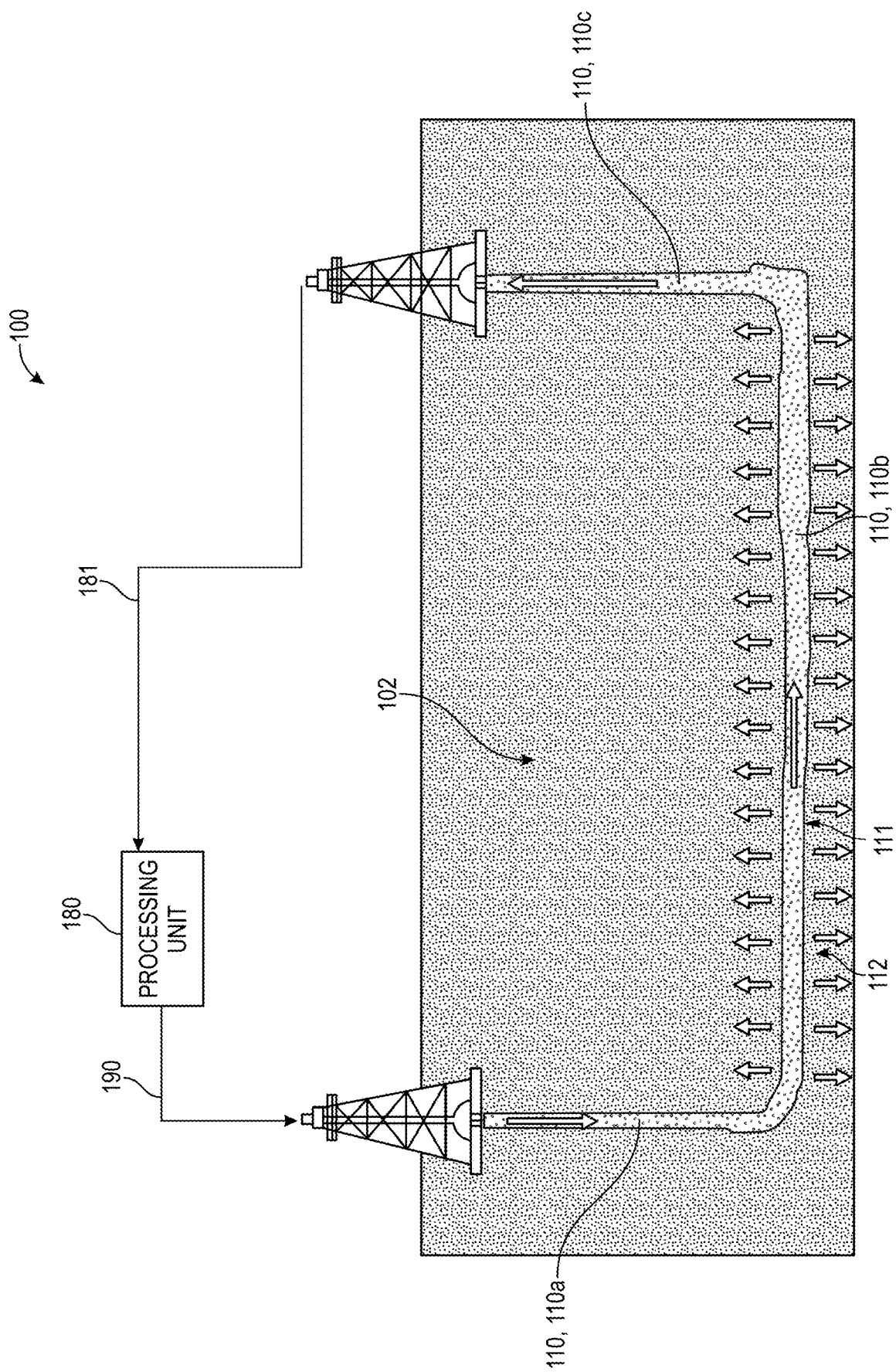

CARBON DIOXIDE MINERALIZATION AND STORAGE

FIELD OF THE DISCLOSURE

The present disclosure relates generally to carbon dioxide sequestration and, more particularly, to mineralization and storage of carbon dioxide.

BACKGROUND OF THE DISCLOSURE

Reducing greenhouse gas emissions such as those of carbon dioxide are included in many energy transition plans. In particular, carbon capture, utilization, and storage (CCUS) is believed to be a promising technology area for reducing greenhouse gas emissions. As global populations continue to rise, use of fossil-fuels will continue for purposes including heating and cooling, power generation, transport, and industry. CCUS offers emission reduction technology that may be applied across the energy system. CCUS technologies allow for the capture of carbon dioxide ($CO_2$) from fuel combustion or other industrial processes, transportation of the $CO_2$, and use of the $CO_2$ either through a storage means (e.g., in subterranean geological formations) or as a resource to create products or services (e.g., for industrial uses).

Carbon dioxide mineralization is a form of CCUS whereby $CO_2$ is chemically converted to a mineral, often a carbonate compound. Mineralization of $CO_2$ allows for stable storage and/or processing of carbonate product for industrial use.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A first nonlimiting example method of the present disclosure may include: introducing, through an injection region of a unified wellbore to a subterranean formation, a carbonated aqueous fluid comprising carbon dioxide dispersed within an aqueous fluid, wherein the subterranean formation comprises a basaltic formation; reacting the carbon dioxide or an ion thereof with the basaltic formation to form mineralized carbon and a produced aqueous fluid; flowing a mixture of the carbonated aqueous fluid and the produced aqueous fluid through a delivery region of the unified wellbore; depositing the mineralized carbon dioxide within the subterranean formation; and flowing the produced aqueous fluid from the subterranean formation through a production region of the unified wellbore, wherein the injection region and the production region are substantially vertical, and wherein the delivery region is substantially horizontal.

A second nonlimiting example method of the present disclosure may include: introducing, through an injection region of a unified wellbore to a subterranean formation, a carbonated aqueous fluid comprising carbon dioxide dispersed within an aqueous fluid, wherein the subterranean formation comprises a basaltic formation; reacting the carbon dioxide or an ion thereof with the basaltic formation to form mineralized carbon and a produced aqueous fluid; flowing a mixture of the carbonated aqueous fluid and the produced aqueous fluid through a delivery region of the unified wellbore; maintaining, for a residence time, the mixture within the subterranean formation; depositing the mineralized carbon dioxide within the subterranean formation; flowing the produced aqueous fluid from the subterranean formation through a production region of the unified wellbore, wherein the injection region and the production region are substantially vertical, and wherein the delivery region is substantially horizontal; carbonating the produced aqueous fluid such that the produced aqueous fluid is converted recycled carbonated aqueous fluid; and introducing the recycled carbonated aqueous fluid to the subterranean formation along with the carbonated aqueous fluid.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

The FIGURE is a diagram of a nonlimiting example system according to the present disclosure.

DETAILED DESCRIPTION

Embodiments of the present disclosure will now be described in detail with reference to the accompanying FIGURE(S). Like elements in the various FIGURE(S) may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying FIGURE(S) may vary without departing from the scope of the present disclosure.

Embodiments in accordance with the present disclosure generally relate to carbon dioxide sequestration and, more particularly, to mineralization and storage of carbon dioxide.

The present disclosure provides methods and systems for carbon dioxide sequestration through mineralization and dissolution of carbon dioxide through use of aqueous solutions. The present disclosure may allow for mineralization of carbon dioxide in a stable manner that reduces overall greenhouse gas emissions. Furthermore, the present disclosure may allow for mineralization with reduced water used as compared to conventional methods.

"Carbon dioxide," "carbon dioxide gas," and grammatical variations thereof as used herein may refer to carbon dioxide in gaseous, aqueous, or like forms, or any combination thereof.

The present disclosure may utilize carbonated aqueous fluid having carbon dioxide dissolved or otherwise dispersed therein.

Carbonated aqueous fluid may subsequently be introduced to a subterranean formation, preferably a subterranean formation comprising basaltic rock therein for mineralization of the carbon dioxide. Following mineralization, carbonated aqueous fluid may become produced aqueous fluid.

Subsequently produced aqueous fluid may be carbonated and recycled for mineralization in a subterranean formation (e.g., within the subterranean formation from which the produced aqueous fluid originated, a different subterranean formation from which the produced aqueous fluid originated, or any combination thereof).

Suitable formations for use in mineralization of carbon dioxide according to the present disclosure may include formations having minerals therein capable of reacting with carbon dioxide or ions thereof and converting said carbon dioxide to mineralized carbon dioxide. Examples of suitable formations may include, but are not limited to, basaltic formations, mafic formations, ultramafic formations, the like, or any combination thereof. Suitable formations may include minerals of elements including, but not limited to, calcium (Ca), magnesium (Mg), iron (Fe), the like, or any combination thereof. Example minerals of interest for reaction to form mineralized carbon dioxide according to the present disclosure may include, but are not limited to, for example, fosterite ($Mg_2SiO_4$), plagioclase ($CaAl_2Si_2O_8$), the like, or any combination thereof.

Carbonated aqueous fluids as used in the present disclosure may comprise any suitable aqueous fluid including, but not limited to, for example, brine, seawater, waste water, brine from desalination, produced water, formation water, the like, or any combination thereof. Aqueous fluids included in the carbonated aqueous fluid may have any suitable total dissolved solids content (TDS), including a TDS of 100 ppm to 250,000 ppm (or 100 ppm to 100,000 ppm, or 1,000 ppm to 250,000 ppm), prior to addition of carbon dioxide. Carbonated aqueous fluid of the present disclosure may further include one or more additional additives for achieving one or more desired functions in addition to mineralization of carbon dioxide. Examples of suitable additional additives may include, but are not limited to, a salt, an inert solid, a fluid loss control agent, an emulsifier, a dispersion aid, a corrosion inhibitor, an emulsion thinner, an emulsion thickener, a viscosifying agent, a gelling agent, a surfactant, a particulate, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a control agent, the like, or any combination thereof. Additional additives may be included in carbonated aqueous fluids of the present disclosure for reducing or otherwise mitigating blockage of channels within the subterranean formation; such additives for mitigating blockage may include, but are not limited to, an acidizing agent, a surfactant, a kinetic inhibitor, the like, or any combination thereof. Suitable examples of the foregoing discussed additional additives will be familiar to one having ordinary skill in the art.

Carbon dioxide may have been previously introduced to carbonated aqueous fluid at any suitable pressure, temperature, and flowrate as well as in any suitable amount. Carbon dioxide may be present in the carbonated aqueous fluid at any suitable concentration. Carbon dioxide may be present in the carbonated aqueous fluid at a quantity at or greater than the saturation limit of carbon dioxide gas in the aqueous fluid, such that the carbonated aqueous fluid is oversaturated. "Saturation limit," "saturated," and grammatical variations thereof, as used herein refers to wherein a solution has absorbed a maximum amount of a solute at given temperature and pressure conditions. "Oversaturated" as used herein refers to a solution that contains more solute than the maximum saturated amount, wherein the additional solute beyond the maximum saturated amount cannot be absorbed in the solution at given temperature and pressure conditions. As a nonlimiting example, carbon dioxide may be present in the carbonated aqueous fluid at a quantity that is from about 0.01 mol % to about 25 mol % (or about 0.1 mol % to about 15 mol %, or about 5 mol % to about 15 mol %).

Within carbonated aqueous fluid, carbon dioxide ($CO_2$) may undergo a disassociation reaction. Without being bound by theory, nonlimiting example reactions depicting disassociation of $CO_2$ in aqueous fluid are shown in Equations 1 and 2 below.

$$CO_2(aq) + H_2O(aq) \leftrightarrow H_2CO_3(aq) \quad (1)$$

$$H_2CO_3(aq) \leftrightarrow HCO_3^-(aq) + H^+(aq) \quad (2)$$

Carbonated aqueous fluid may be introduced to the subterranean formation in any suitable fashion, including injecting carbon dioxide into an aqueous fluid within the subterranean formation, injecting a previously carbonated aqueous fluid into the subterranean formation, or any combination thereof. Carbonated aqueous fluid may be introduced at any suitable pressure. Carbonated aqueous fluid may be added to the subterranean formation at any suitable flow rate. The flow rate may be determined by features of the subterranean formation (e.g., geology, pore volume, wellbore depth, the like, or any combination thereof). Carbonated aqueous fluid may be added into the subterranean formation in any quantity including a quantity greater than the stoichiometric quantity needed to completely react with minerals of the subterranean formation. Such greater than stoichiometrically needed quantity may allow for ensuring sufficient reaction of the carbon dioxide and minerals of the subterranean formation to form mineralized carbon dioxide. As a nonlimiting example, the quantity of carbon dioxide introduced to the subterranean formation may preferably be from about 5% to about 25% (or about 10% to about 20%) pore volume of the subterranean formation.

Minerals of the subterranean formation may form ions due to interaction with carbonated aqueous fluid and/or ions therein. Without being bound by theory, minerals of the subterranean formation may generally form mineral-element ions ($M^{2+}$) within the subterranean formation according to Equation 3

$$M_aX + bH^+ \rightarrow aM^{2+} + cH_2O + [byproducts] \quad (3)$$

where X represents a suitable moiety of a suitable mineral compound including M, where a, b, and c are constants, where M represents any suitable mineral-element of the subterranean formation. Suitable mineral-elements for interaction with carbon dioxide may include, but are not limited to, for example, calcium (Ca), magnesium (Mg), iron (Fe), the like, or any combination thereof. Byproducts of Equation 3 may include various mineral compounds (e.g., oxides, the like). Specific nonlimiting examples of Equation 3 are shown below in Equations 3A and 3B.

$$Mg_2SiO_4(s) + 4H^+(aq) \rightarrow 2Mg^{2+}(aq) + H_2O(aq) + SiO_2(aq) \quad (3A)$$

$$CaAl_2Si_2O_8(s) + 8H^+(aq) \rightarrow \quad (3B)$$
$$Ca^{2+}(aq) + 2Al^{3+}(aq) + 4H_2O(aq) + 2SiO_2(aq)$$

The carbonated aqueous fluid may contact minerals of the subterranean formation, subsequently converting carbon dioxide ($CO_2$) to mineralized carbon dioxide ($MCO_3$) through interaction with mineral-element ions ($M^{2+}$) formed within the subterranean formation. Without being bound by theory, nonlimiting example reactions are shown in Equations 4 and 5 below.

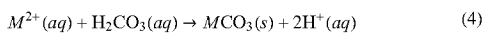

$$M^{2+}(aq) + H_2CO_3(aq) \to MCO_3(s) + 2H^+(aq) \qquad (4)$$

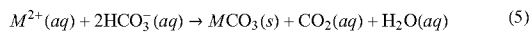

$$M^{2+}(aq) + 2HCO_3^-(aq) \to MCO_3(s) + CO_2(aq) + H_2O(aq) \qquad (5)$$

where M represents any suitable mineral-element of the subterranean formation. Mineralized carbon dioxide ($MCO_3$) may precipitate out of solution and be deposited within the subterranean formation for long term storage as shown above. Mineralized carbon dioxide may include any suitable compounds such as, for example, a carbonate compound, a bicarbonate compound, the like, or any combination thereof. Carbonated compounds of interest in the present disclosure may include, but are not limited to, for example, calcium carbonate ($CaCO_3$), magnesium carbonate ($MgCO_3$), ferrous carbonate ($FeCO_3$), the like, or any combination thereof.

The mineralizing of carbon dioxide may occur at any temperature including temperatures of the subterranean formation. Preferred temperatures for mineralizing carbon dioxide may include a temperature of about 5° C. to about 300° C., or about 30° C. to about 300° C., or about 10° C. to about 200° C., or about 25° C. to about 100° C., or about 25° C. to about 125° C. Mineralizing of carbon dioxide may occur at any pressure including pressures of the subterranean formation. Preferred pressures for mineralizing carbon dioxide may include a pressure of about 0.3 MPa to about 35 MPa, or about 0.3 MPa to about 14 MPa, or about 0.3 MPa to about 11 MPa. Such pressure may be maintained, for example, by the introduction of the carbonated aqueous fluid to the subterranean formation and apparatus therefor. Mineralizing of carbon dioxide may occur for a shut-in time, during which carbonated aqueous fluid is maintained within the subterranean formation, allowing carbon dioxide to interact with minerals of the subterranean formation so as to form mineralized carbon dioxide. Such a shut-in time may be from about 1 hour to about 4 years, or about 1 hour to about 3 years, or about 1 hour to about 2 years, or about 1 hour to about 1 year, or about 1 hour to about 180 days, or about 30 days to about 2 years, or about 30 days to about 1 year, or about 180 days to about 4 years, or about 2 years to about 4 years, or about 2 years to about 3 years. It should be noted that in some embodiments, methods and systems of the present disclosure may operate, at least a portion of the time, in a continuous fashion in which carbonated aqueous fluid is continuously introduced to a subterranean formation and/or produced aqueous fluid is continuously removed from the subterranean formation. In such continuous operation, shut-in time may correspond to residence time of carbonated aqueous fluid within the subterranean formation. "Residence time," as used herein refers to a time during which a quantity of carbonated aqueous fluid is exposed to minerals within the subterranean formation for reaction to form mineralized carbon dioxide.

It should be noted that the present disclosure may include systems and methods for mineralizing carbon dioxide as described. Such methods may include introducing carbonated aqueous fluid to a subterranean formation through an introduction region of a unified wellbore, reacting the carbon dioxide or an ion thereof with the subterranean formation to form mineralized carbon dioxide, depositing the mineralized carbon dioxide within the subterranean formation, including within a delivery zone of the subterranean formation, thereby forming a produced aqueous fluid from the carbonated aqueous fluid, flowing the carbonated aqueous fluid and/or the produced aqueous fluid through a delivery region of the unified wellbore, and flowing the produced aqueous fluid from the subterranean formation through a production region of the unified wellbore.

The unified wellbore may be u-shaped such that the unified wellbore may have a substantially vertical introduction region, a substantially horizontal delivery region, and a substantially vertical production region, all fluidly connected. The unified wellbore may allow for uninterrupted flow of carbonated aqueous fluid and/or produced aqueous fluid for increased mineralization efficiency during a continuous operation, a batchwise operation, or any combination thereof. The introduction region, the delivery region, and the production region may have a substantially unified diameter, allowing ease of flow of fluids (e.g., carbonated aqueous fluid, produced aqueous fluid) through the unified wellbore. The delivery region may have a length suitable to allow sufficient mineralization of carbon dioxide as fluids flow along the length of the delivery region. Example lengths of a delivery region may be from about 500 ft (152.4 m) to about 10,000 ft (3,048 m), or about 1,000 ft (304.8 m) to about 7,500 ft (2286 m), or about 5,000 ft (1,524 m) to about 7,000 ft (2133.6 m), or about 5,000 ft (1,524 m) or greater, or about 1,000 ft (304.8 m) or greater.

"Substantially unified diameter," and grammatical variations thereof refers to two or more wellbores or regions of a wellbore that may have average diameters that may generally be within about 0% to about 25%, or about 0% to about 20%, or about 0% to about 10%, or about 0% to about 5%, or about 0.0001% to about 25%, or about 0.0001% to about 20%, or about 0.0001% to about 10%, or about 0.0001% to about 5%, or less than about 20%, or less than about 10%, or less than about 5%, of each other, the percentage based on the diameter of the smaller wellbore or wellbore region. As a nonlimiting example, a first wellbore region having an average diameter of 20.4 cm and a second wellbore region having an average diameter of 22.5 cm may be said to have average diameters within about 10.3% of each other, thus having substantially unified diameters.

"Substantially horizontal" or "substantially vertical," and grammatical variations thereof as used herein refers to a wellbore and/or tubing primarily in the horizontal or vertical plane, respectively, with a central axis of the wellbore tubing deviating from the respective plane by about 45 degrees or less, or about 30 degrees or less, or about 20 degrees or less, or about 10 degrees or less, or about 5 degrees or less, or about 0 degrees, about 0 degrees to about 45 degrees, or about 0 degrees to about 20 degrees, or about 0 degrees to about 5 degrees.

Methods and systems of the present disclosure may further include recycling of produced aqueous fluid for mineralization in a subterranean formation. Such produced aqueous fluid may be carbonated according to the present disclosure and subsequently may be introduced to a subterranean formation for mineralization therein as recycled carbonated aqueous fluid. Such recycling may occur within the subterranean formation from which the produced aqueous fluid originated, a different subterranean formation from which the produced aqueous fluid originated, or any combination thereof.

In some embodiments, the fluids (e.g., carbonated aqueous fluid) disclosed herein (including mixing of individual components or mixtures thereof) may be mixed at a remote location from a job site and shipped thereto or, in other embodiments, the fluids may be mixed at a job site. In still other embodiments, the fluids may be mixed and pumped into a subterranean formation on-the-fly. A person having ordinary skill in the art of designing such fluids with the benefit of this disclosure will be able to consider these factors and determine whether remote mixing, on-site mixing, or any other suitable mixing protocol is most appropriate for a given operation. The systems used for handling fluids for use in operations of the present disclosure may include one or more mixing and/or storage tanks used for mixing and/or storing, respectively, fluids prior to use in a carbon dioxide mineralization operation. Additional tanks may be used for storing fluids removed from a subterranean formation as part of the operation. Following a carbon dioxide mineralization operation, the fluids or a spent or partially spent variant thereof may be produced from the subterranean formation during fluid flowback as outflow solution.

Systems for introduction of fluids (e.g., carbonated aqueous fluid) to a wellbore in conjunction with a carbon dioxide mineralization operation may comprise a pump fluidly coupled to a tubing, the tubing located at least partially within the wellbore and the tubing containing a fluid for a desired operation. The "pump" described herein may comprise a single pump or may comprise one or more pumps in any combination. Given the benefit of the present disclosure, one having ordinary skill in the art will be able to select an appropriate pump or combination of pumps for a given operation.

The fluids of the present disclosure may be introduced (e.g., injected, pumped) through an injection region of a wellbore to a subterranean formation using a wellbore tubing located within the wellbore. The fluid used in a particular operation may flow downhole through the wellbore tubing and flow out of the tubing into the subterranean formation for mineralization of carbon dioxide therein. Such wellbore tubing of a wellbore may have portions that may be substantially horizontal, substantially vertical, or any combination thereof, as described herein. Such fluids may flow through a delivery region in a delivery zone of the subterranean formation. Subsequently, fluids may be flowed back through a production region of the wellbore along with residual components as produced aqueous fluid. The produced aqueous fluid may flow through a wellbore tubing or wellbore annulus. The use of such produced aqueous fluid may be for any suitable purpose including, but not limited to, for example, recycling fluids or to relieve pressure of the subterranean formation.

A nonlimiting example system 100 for introduction of fluids according to the present disclosure is shown in the FIGURE. System 100 may include an injection region wellbore 110a of a unified wellbore 110 for introduction of fluids to a subterranean formation 102. System 100 may further include a delivery zone 112, in which delivery region 110b of unified wellbore 110 may deliver fluids for mineralization within the subterranean formation 102. Fluids may flow through the delivery zone 112 and mineralize on contact with one or more wellbore walls 111 in the delivery region 110b. Following passage through the delivery region, fluid may move toward production region 110c of unified wellbore 110 and be removed from the subterranean formation 102.

As depicted in the FIGURE, delivery region 110b of injection wellbore 110 may be substantially horizontal, as described previously. Furthermore, injection region 110a and production region 110c of wellbore 110 may be substantially vertical.

Furthermore, fluids removed from production region 110c of unified wellbore 110 may be conveyed by one or more recycle lines (e.g., recycle line 181) to processing unit 180. Processing unit 180 may carbonate produced fluids (e.g., produced aqueous fluid) and may supply fluids (e.g., recycled carbonated aqueous fluid, produced aqueous fluid, the like, or any combination thereof) to injection region 110a via a line 190.

It should be noted that additional nonlimiting components may be present in systems suitable to introduce the fluids (e.g., carbonated aqueous fluid) of the present disclosure to a subterranean formation and/or to recover fluid from the subterranean formation. Such additional components will be familiar to one having ordinary skill in the art and include, but are not limited to, supply hoppers, valves, condensers, adapters, joints, gauges, sensors, compressors, pressure controllers, pressure sensors, flow rate controllers, flow rate sensors, temperature sensors, the like, or any combination thereof.

ADDITIONAL EMBODIMENTS

Embodiments disclosed herein include:

Embodiment 1. A method comprising: introducing, through an injection region of a unified wellbore to a subterranean formation, a carbonated aqueous fluid comprising carbon dioxide dispersed within an aqueous fluid, wherein the subterranean formation comprises a basaltic formation; reacting the carbon dioxide or an ion thereof with the basaltic formation to form mineralized carbon and a produced aqueous fluid; flowing a mixture of the carbonated aqueous fluid and the produced aqueous fluid through a delivery region of the unified wellbore; depositing the mineralized carbon dioxide within the subterranean formation; and flowing the produced aqueous fluid from the subterranean formation through a production region of the unified wellbore, wherein the injection region and the production region are substantially vertical, and wherein the delivery region is substantially horizontal.

Embodiment 2. The method of Embodiment 1, wherein the injection region, the delivery region, and the production region of the unified wellbore have a substantially unified diameter.

Embodiment 3. The method of Embodiment 1 or 2, wherein the delivery region has a length of about 5,000 ft to about 7,000 ft.

Embodiment 4. The method of any one of Embodiments 1-3, further comprising: carbonating the produced aqueous fluid such that the produced aqueous fluid is converted recycled carbonated aqueous fluid; and introducing the recycled carbonated aqueous fluid to the subterranean formation along with the carbonated aqueous fluid.

Embodiment 5. The method of any one of Embodiments 1-4, wherein the basaltic formation comprises a mineral of at least one of: calcium, magnesium, or iron.

Embodiment 6. The method of any one of Embodiments 1-5, further comprising: maintaining, for a shut-in time, the mixture within the subterranean formation during the reacting of the carbon dioxide or the ion thereof with the basaltic formation.

Embodiment 7. The method of Embodiment 6, wherein the shut-in time is from about 1 hour to about 90 days.

Embodiment 8. The method of any one of Embodiments 1-7, wherein the carbon dioxide is at least partially dissolved within the aqueous fluid.

Embodiment 9. The method of any one of Embodiments 1-8, wherein the carbonated aqueous fluid has total dissolved solids of about 100 parts per million (ppm) to about 250,000 ppm.

Embodiment 10. The method of any one of Embodiments 1-9, wherein a quantity of the carbon dioxide introduced to the subterranean formation is in excess of a stoichiometric quantity needed to completely react with the basaltic formation to form the mineralized carbon dioxide.

Embodiment 11. The method of any one of Embodiments 1-10, wherein the mineralized carbon dioxide comprises a carbonate compound selected from the group consisting of calcium carbonate, magnesium carbonate, ferrous carbonate, and combinations thereof.

Embodiment 12. The method of any one of Embodiments 1-11, wherein the reacting occurs at a pressure of about 0.3 MPa to about 11 MPa.

Embodiment 13. A method comprising: introducing, through an injection region of a unified wellbore to a subterranean formation, a carbonated aqueous fluid comprising carbon dioxide dispersed within an aqueous fluid, wherein the subterranean formation comprises a basaltic formation; reacting the carbon dioxide or an ion thereof with the basaltic formation to form mineralized carbon and a produced aqueous fluid; flowing a mixture of the carbonated aqueous fluid and the produced aqueous fluid through a delivery region of the unified wellbore; maintaining, for a residence time, the mixture within the subterranean formation; depositing the mineralized carbon dioxide within the subterranean formation; flowing the produced aqueous fluid from the subterranean formation through a production region of the unified wellbore, wherein the injection region and the production region are substantially vertical, and wherein the delivery region is substantially horizontal; carbonating the produced aqueous fluid such that the produced aqueous fluid is converted recycled carbonated aqueous fluid; and introducing the recycled carbonated aqueous fluid to the subterranean formation along with the carbonated aqueous fluid.

Embodiment 14. The method of Embodiment 13, wherein the injection region, the delivery region, and the production region of the unified wellbore have a substantially unified diameter.

Embodiment 15. The method of Embodiment 13 or 14, wherein the delivery region has a length of about 5,000 ft to about 7,000 ft.

Embodiment 16. The method of any one of Embodiments 13-15, wherein the basaltic formation comprises a mineral of at least one of: calcium, magnesium, or iron.

Embodiment 17. The method of any one of Embodiments 13-16, wherein the residence time is from about 1 hour to about 90 days.

Embodiment 18. The method of any one of Embodiments 13-17, wherein the carbonated aqueous fluid has total dissolved solids of about 100 parts per million (ppm) to about 250,000 ppm.

Embodiment 19. The method of any one of Embodiments 13-18, wherein a quantity of the carbon dioxide introduced to the subterranean formation is in excess of a stoichiometric quantity needed to completely react with the basaltic formation to form the mineralized carbon dioxide.

Embodiment 20. The method of any one of Embodiments 13-19, wherein the mineralized carbon dioxide comprises a carbonate compound selected from the group consisting of calcium carbonate, magnesium carbonate, ferrous carbonate, and combinations thereof.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:
   providing a carbonated aqueous fluid comprising carbon dioxide dispersed within an aqueous fluid;
   introducing the carbonated aqueous fluid to a subterranean formation via a unified wellbore comprising an injection region and a production region that are connected by a delivery region that is contiguous with and extends continuously between the injection region and the production region, the carbonated aqueous fluid being introduced through the injection region and entering the delivery region;
   wherein the injection region, the production region, and the delivery region each have wellbore diameters that are within 25% of each other; and
   wherein the subterranean formation comprises a basaltic formation;

reacting the carbon dioxide or an ion thereof with the basaltic formation, as the carbonated aqueous fluid flows through the delivery region and is maintained therein for a shut-in time, wherein, during the shut-in time, flow within the unified wellbore is interrupted, thus contacting one or more unified wellbore walls along the entire length thereof, to form mineralized carbon and a produced aqueous fluid;

flowing a mixture of the carbonated aqueous fluid and the produced aqueous fluid through the delivery region to the production region;

depositing the mineralized carbon within the subterranean formation; and flowing the produced aqueous fluid received from the delivery region through the production region, the produced aqueous fluid exiting the subterranean formation via the production region;

wherein the injection region and the production region are substantially vertical, and the delivery region is substantially horizontal.

2. The method of claim 1, wherein the delivery region has a length of about 5,000 ft to about 7,000 ft.

3. The method of claim 1, further comprising: carbonating the produced aqueous fluid such that the produced aqueous fluid is converted to a recycled carbonated aqueous fluid; and re-introducing the recycled carbonated aqueous fluid to the subterranean formation along with the carbonated aqueous fluid.

4. The method of claim 1, wherein the basaltic formation comprises a mineral of at least one of calcium, magnesium, or iron.

5. The method of claim 1, wherein the shut-in time is from about 1 hour to about 90 days.

6. The method of claim 1, wherein the carbon dioxide is at least partially dissolved within the aqueous fluid.

7. The method of claim 1, wherein the carbonated aqueous fluid has total dissolved solids of about 100 parts per million (ppm) to about 250,000 ppm.

8. The method of claim 1, wherein a quantity of the carbon dioxide introduced to the subterranean formation is in excess of a stoichiometric quantity needed to completely react with the basaltic formation to form the mineralized carbon.

9. The method of claim 1, wherein the mineralized carbon comprises a carbonate compound selected from the group consisting of calcium carbonate, magnesium carbonate, ferrous carbonate, and combinations thereof.

10. The method of claim 1, wherein the reacting occurs at a pressure of about 0.3 MPa to about 11 MPa.

11. The method of claim 1, further comprising: adding an acidizing agent, a surfactant, a kinetic inhibitor, or any combination thereof, to the provided carbonated aqueous fluid, such that, during the reacting step, a blockage of channels of the one or more unified wellbore walls is at least partially reduced or mitigated.

12. A method comprising:
providing a carbonated aqueous fluid comprising carbon dioxide dispersed within an aqueous fluid;
introducing the carbonated aqueous fluid to a subterranean formation via a unified wellbore comprising an injection region and a production region that are connected by a delivery region that is contiguous with and extends continuously between the injection region and the production region, the carbonated aqueous fluid being introduced through the injection region and entering the delivery region;

wherein the injection region, the production region, and the delivery region each have wellbore diameters that are within 25% of each other; and wherein the subterranean formation comprises a basaltic formation;

reacting the carbon dioxide or an ion thereof with the basaltic formation, as the carbonated aqueous fluid flows through the delivery region and is maintained therein for a residence time, wherein, during the residence time, flow within the unified wellbore is not interrupted, thus contacting one or more unified wellbore walls along the entire length thereof, to form mineralized carbon and a produced aqueous fluid;

flowing a mixture of the carbonated aqueous fluid and the produced aqueous fluid through the delivery region to the production region;

depositing the mineralized carbon within the subterranean formation;

flowing the produced aqueous fluid received from the delivery region through the production region, the produced aqueous fluid exiting the subterranean formation via the production region;

wherein the injection region and the production region are substantially vertical, and the delivery region is substantially horizontal;

carbonating the produced aqueous fluid such that the produced aqueous fluid is converted to a recycled carbonated aqueous fluid; and re-introducing the recycled carbonated aqueous fluid to the subterranean formation along with the carbonated aqueous fluid.

13. The method of claim 12, wherein the delivery region has a length of about 5,000 ft to about 7,000 ft.

14. The method of claim 12, wherein the basaltic formation comprises a mineral of at least one of calcium, magnesium, or iron.

15. The method of claim 12, wherein the residence time is from about 1 hour to about 90 days.

16. The method of claim 12, wherein the carbonated aqueous fluid has total dissolved solids of about 100 parts per million (ppm) to about 250,000 ppm.

17. The method of claim 12, wherein a quantity of the carbon dioxide introduced to the subterranean formation is in excess of a stoichiometric quantity needed to completely react with the basaltic formation to form the mineralized carbon.

18. The method of claim 12, wherein the mineralized carbon comprises a carbonate compound selected from the group consisting of calcium carbonate, magnesium carbonate, ferrous carbonate, and combinations thereof.

19. The method of claim 12, further comprising: adding an acidizing agent, a surfactant, a kinetic inhibitor, or any combination thereof, to the provided carbonated aqueous fluid, such that, during the reacting step, a blockage of channels of the one or more unified wellbore walls is at least partially reduced or mitigated.

* * * * *